US011118453B2

(12) United States Patent
Wei

(10) Patent No.: US 11,118,453 B2
(45) Date of Patent: Sep. 14, 2021

(54) SYSTEM AND METHOD OF LAYERING MATERIAL

(71) Applicant: Caterpillar Inc., Deerfield, IL (US)

(72) Inventor: Mo Wei, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 336 days.

(21) Appl. No.: 15/980,831

(22) Filed: May 16, 2018

(65) Prior Publication Data

US 2019/0353034 A1    Nov. 21, 2019

(51) Int. Cl.
| | | |
|---|---|---|
| *E21C 41/26* | (2006.01) | |
| *G05D 1/02* | (2020.01) | |
| *E02F 5/24* | (2006.01) | |
| *E02F 9/20* | (2006.01) | |
| *E02F 3/84* | (2006.01) | |

(52) U.S. Cl.
CPC .............. *E21C 41/26* (2013.01); *E02F 3/841* (2013.01); *E02F 9/205* (2013.01); *G05D 1/021* (2013.01); *G05D 1/0278* (2013.01); *G05D 2201/0202* (2013.01)

(58) Field of Classification Search
CPC .......... E21C 41/26; E02F 3/841; E02F 9/205; G05D 1/021; G05D 1/0278; G05D 2201/0202
See application file for complete search history.

(56) References Cited

U.S. PATENT DOCUMENTS

| | | | | |
|---|---|---|---|---|
| 6,502,016 B1* | 12/2002 | Ozaki | ..................... | E02F 3/841 |
| | | | | 701/23 |
| 9,297,147 B1* | 3/2016 | Wei | ......................... | E02F 9/205 |
| 9,481,977 B1* | 11/2016 | Clar | ....................... | E02F 9/2045 |
| 9,702,115 B1* | 7/2017 | Darukhanavala | ......... | E02F 9/26 |
| 9,732,502 B2* | 8/2017 | Fletcher | ................... | E02F 3/431 |
| 9,783,955 B1* | 10/2017 | Clar | ..................... | G05D 1/0219 |
| 9,803,336 B2* | 10/2017 | Wei | ......................... | E02F 3/845 |
| 9,909,284 B2* | 3/2018 | DeVore | .................... | E02F 9/262 |
| 2010/0031538 A1* | 2/2010 | Hall | ........................ | E02F 3/815 |
| | | | | 37/195 |
| 2012/0136523 A1* | 5/2012 | Everett | .................. | E02F 9/2045 |
| | | | | 701/24 |
| 2014/0032132 A1* | 1/2014 | Stratton | ................. | E02F 9/2029 |
| | | | | 702/33 |
| 2014/0180444 A1* | 6/2014 | Edara | ...................... | E02F 3/841 |
| | | | | 700/56 |
| 2016/0076893 A1* | 3/2016 | Wei | ....................... | G05D 1/0214 |
| | | | | 701/410 |
| 2016/0153175 A1* | 6/2016 | Wei | ......................... | E02F 9/262 |
| | | | | 701/50 |
| 2016/0163088 A1* | 6/2016 | Clar | ....................... | E02F 9/2054 |
| | | | | 701/23 |

(Continued)

*Primary Examiner* — Nadeem Odeh
*Assistant Examiner* — Nicholas K Morgan
(74) *Attorney, Agent, or Firm* — Schwegman, Lundberg & Woessner

(57) ABSTRACT

A system for moving material from a first work area to a second work includes a material moving machine, a machine position sensor and a controller system. The controller system performs first material moving operations including determining a premature termination of a material stacking operation. The controller system performs additional material moving operations including instructing a material moving machine in response to the premature termination of a material stacking operation.

20 Claims, 8 Drawing Sheets

(56) References Cited

U.S. PATENT DOCUMENTS

2016/0343095 A1\* 11/2016 Wei .................. G06Q 10/06398
2017/0002546 A1\* 1/2017 Fletcher .................. E02F 9/261
2017/0009426 A1\* 1/2017 Wei ....................... E02F 9/2054

\* cited by examiner

SYSTEM AND METHOD OF LAYERING MATERIAL

TECHNICAL FIELD

This document pertains generally, but not by way of limitation, to controlling a machine and, more particularly, to a system and method for controlling a material moving machine and layering material dump locations.

BACKGROUND

Machines such as dozers, motor graders, wheel loaders, etc., are used to perform a variety of tasks. For example, these material moving machines may be used to move material at a work site. The machines may operate in an autonomous or semi-autonomous manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

In some operations such as mining, it is desirable to move material from one location to another, such as to expose a layer of material to be mined. When these material moving operations are performed by machines such as dozers, the material is moved as a plurality of layers with each layer being stacked or laid upon the previously formed layer. The layer creation process may be inefficient and uneven layers may result in inefficient and unsteady movement over the previously formed layers. See for example, U.S. Pat. No. 9,783,955 which discloses a controller-implemented method for moving material with a machine at a work site.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein.

SUMMARY

In one embodiment, a computer-implemented method of responding to a premature direction reversal of a material moving machine is described. The computer-implemented method comprises monitoring, by a control system, a location of the material moving machine. The control system determines a premature direction reversal location of the material moving machine based at least partially on a deviation distance between the location of the material moving machine and a target material pile location. The premature direction reversal location represents a location of an improperly placed material pile. The control system stores the location of the improperly placed material pile and controls the material moving machine to re-engage and move the improperly placed material pile to the target material pile location.

In another embodiment, a control system for responding to an incomplete material pile operation by a material moving machine is described. The control system comprises a memory configured to retrievably store one or more algorithms, and a controller in communication with the memory. The controller, based on the one or more algorithms, is configured to identify a premature direction reversal of the material moving machine based at least partially on a material moving machine position and a target material pile location. The controller is further configured to instruct the material moving machine to move to a determined location, instruct the material moving machine to return to the premature direction reversal location, and instruct the material moving machine to restart a material moving procedure at the premature direction reversal location to move material to the target pile location.

In another embodiment, an autonomous method of mining using a dozer is described. The dozer comprises a drive mechanism to move the dozer in forward and reverse directions, an adjustable blade for pushing material when the dozer moves in the forward direction, and a location position sensor to determine a position of the dozer. The method comprises monitoring the location of the dozer and calculating a target material pile location zone for the dozer to push material. The target material pile location zone including a beginning location and farthest location. The method further comprises providing instructions to the drive mechanism and the adjustable blade of the dozer to move the dozer toward the target material pile location zone while pushing material, comparing the location of the dozer to the target material pile location zone, and storing the location of the dozer when it reverses direction from the forward direction to the reverse direction if the dozer reverses direction before the dozer entered the target material pile location zone while pushing material. Instructions are provided to the drive mechanism and the adjustable blade of the dozer to move the dozer location to an improperly placed material pile and adjust the blade to push the improperly placed material pile into the target material pile location zone.

DETAILED DESCRIPTION

Figure 1:
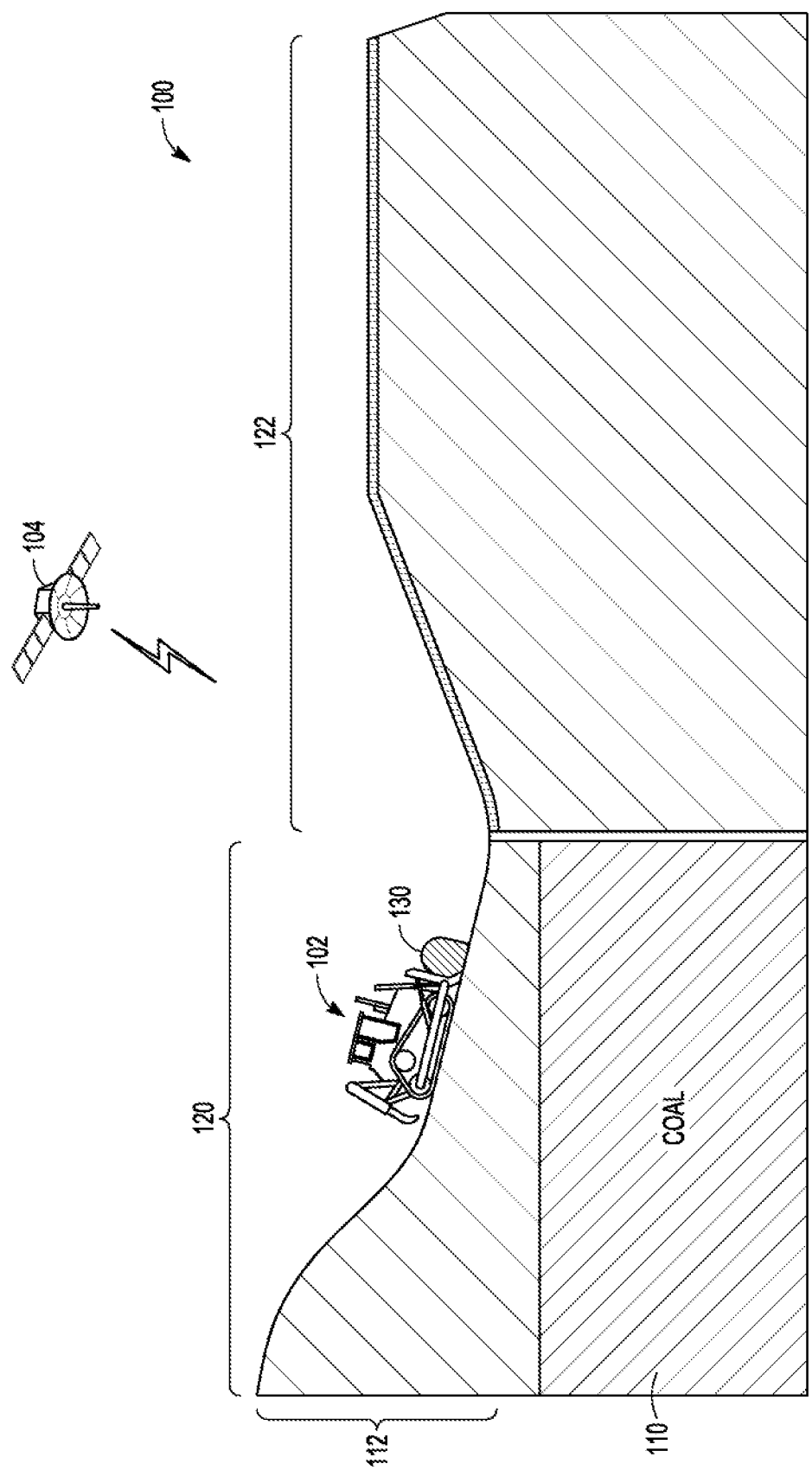
FIG. 1 illustrates one exemplary worksite with a machine in accordance with this disclosure.

Referring now to FIG. 1, one exemplary worksite 100 is illustrated with a moving machine 102 performing predetermined tasks. Although material moving machine 102 is disclosed as a unitary machine it is contemplated that multiple material moving machines may be used on worksite 100. The worksite 100 may include, for example, a mine site, a landfill, a quarry, a construction site, or any other type of worksite. The predetermined task may be associated with altering the geography at the worksite 100, such as a dozing operation, a grading operation, a leveling operation, a bulk material removal operation, or any other type of operation that results in geographical modifications within the worksite 100. The machines 102 may be mobile machines configured to perform operations associated with industries related to mining, construction, farming, or any other industry known in the art. The machine 102 depicted in FIG. 1, for example, may embody an earth moving machine, such as a dozer having a blade or other work tools or implements movable by way of one or more actuators. The machine 102 may also include manned machines or any type of autonomous or semi-autonomous machine.

The overall operation of the machine 102 and implements within the worksite 100 may be managed by a control system (not shown in FIG. 1) that is at least partially in communication with the machine 102. Moreover, each machine 102 may include any one or more of a variety of feedback devices capable of signaling, tracking, monitoring, or otherwise communicating relevant machine information to the control system. For example, each machine 102 may include a locating device configured to communicate with one or more satellites 104, which in turn, may communicate to the control system various information pertaining to the position and/or orientation of the machine 102 relative to the worksite 100. Each machine 102 may additionally include one or more implement sensors configured to track and communicate position and/or orientation information of the implements to the control system. Furthermore, implement load, such as the relative weight of any material that is loaded into or carried by, for instance, the blade of a dozing machine, may be inferred from engine load, track slip, and the like.

Work site 100 is depicted as a mining site with lower layer 110 of material to be mined such as coal and an upper layer 112 of material such as overburden or topsoil that covers the lower layer 110. At some work sites 100 it may be contemplated that the upper layer 112 is removed from above a portion of the lower layer 110 of material at a first work area 120, referred to as the cut area, and moved to a second work area 122, referred to as the fill area. The exposed lower layer 110 of material is then removed and transported to a desired location at a collection site (not shown). In some instances, the process of movement of the upper layer 112 may be initiated by moving a portion of the upper layer 112 into voids (not shown) located in second area 122. The upper layer 112 is moved by machine 102 from the first work area 120 to second work area 122 one load at a time. In one embodiment, the machine is a dozer that pushes the overburden material, referred to herein as material pile 130, and material piles 300, 304, 306, 308 and 310 (see FIG. 5).

Figure 2:
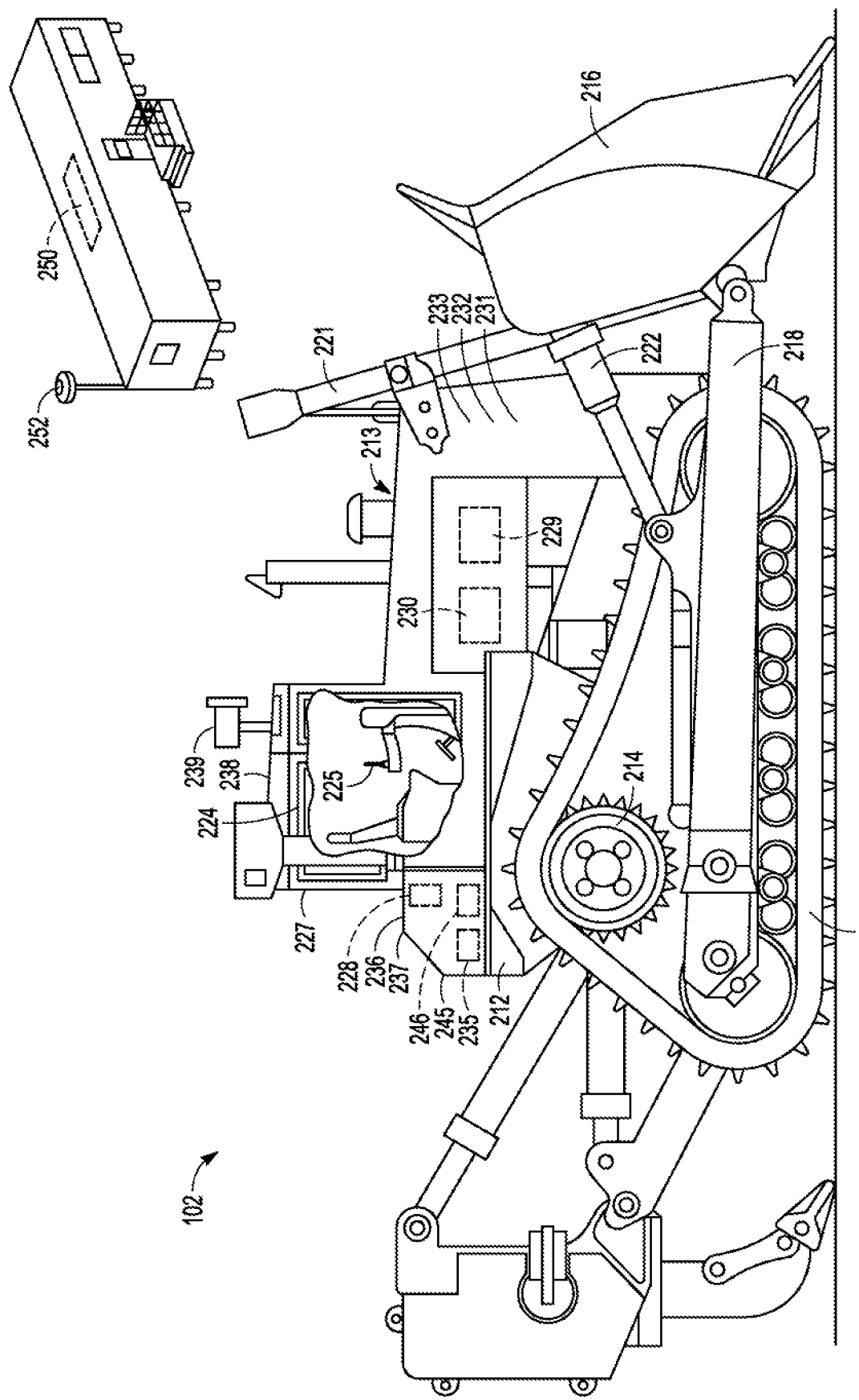
FIG. 2 depicts a diagrammatic illustration of a machine such as a dozer.

FIG. 2 depicts a diagrammatic illustration of a machine 102 such as a dozer, or track type tractor, with a ground engaging work implement such as a blade 216 configured to push material. The machine 102 includes a frame 212 and a prime mover such as an engine 213. A ground-engaging drive mechanism such as a track 215 may be driven by a drive sprocket 214 to propel the machine. Engine 213 is operatively connected to a transmission (not shown) which is operatively connected to the drive sprockets 214 to drive tracks 215. The systems and methods of the disclosure may be used with any machine propulsion and drivetrain mechanisms applicable in the art for causing movement of the machine including hydrostatic, electric, or mechanical drives.

Blade 216 may be pivotably connected to frame 212 by arms 218 on each side of machine 102. First hydraulic cylinder 221 coupled to frame 212 supports blade 216 in the vertical direction and allows blade 216 to move up or down vertically from the point of view of FIG. 2. Second hydraulic cylinders 222 on each side of machine 102 allow the pitch angle of blade tip to change relative to a centerline of the machine.

Machine 102 may include a cab 224 that an operator may physically occupy and provide input to control the machine. Cab 224 may include one or more input devices such as joystick 225 through which the operator may issue commands to control the propulsion system and steering system of the machine as well as operate various implements associated with the machine.

Machine 102 may be controlled by a control system 245. The control system 245 may include an electronic control module or controller 246 and a plurality of sensors. The controller 246 may receive input signals from an operator operating the machine 102 from within cab 224 or off-board through a wireless communications system 252. The controller 246 may control the operation of various aspects of the machine 102 including the drivetrain and the hydraulic systems.

The controller 246 may be an electronic controller that performs operations, executes control algorithms, stores and retrieves data and other desired operations. The controller 246 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 246 such as power supply circuitry, signal conditioning circuitry, driver circuitry, and other types of circuitry.

The controller 246 may be a single controller or may include more than one controller disposed to control various functions and/or features of the machine 102. The term "controller" is meant to be used in its broadest sense to include one or more controllers and/or microprocessors that may be associated with the machine 102 and that may cooperate in controlling various functions and operations of the machine. The functionality of the controller 246 may be implemented in hardware and/or software without regard to the functionality. The controller 246 may rely on one or more data maps relating to the operating conditions and the operating environment of the machine 102 and the work site 100 that may be stored in the memory of controller. Each of these data maps may include a collection of data in the form of tables, graphs, digital images and/or equations.

The control system 245 and the controller 246 may be located on the machine 102 and may also include components, such as additional controllers or processors, located remotely from the machine such as at a command center 250. Command center 250 may include or access memory, secondary storage devices, processors, and any other components for running an application. The functionality of control system 245 may be distributed so that certain functions are performed at machine 102 and other functions are performed remotely. In such case, the control system 245 may include a communications system such as wireless communications system 252 for transmitting signals between the machine 102 and a controller system located remote from the machine.

The control system 245 may be implemented in any number of different arrangements. For example, the control system 245 may be at least partially implemented at command center 250 situated locally and/or remotely relative to the worksite 100 with sufficient means for communicating with the machines 102, for example, via satellites 104, or the like. Additionally, or alternatively, the control system 245 may be implemented using one or more computing devices with means for communicating with one or more of the machines 102 or one or more command centers 250 that may be locally and/or remotely situated relative to the worksite 100. In still further alternatives, the control system 245 may be implemented on-board any one or more of the machines 102 that are also provided within the worksite 100. Other suitable modes of implementing the control system 245 are possible and will be understood by those of ordinary skill in the art.

Using any of the foregoing arrangements, the control system 245 may generally be configured to monitor the position of the machine 102 relative to the worksite 100 and a predetermined target operation, and provide instructions for controlling the machines 102 in an efficient manner in executing the target operation. In certain embodiments, the machines 102 may be configured to excavate areas of a worksite 100 according to one or more predefined excavation plans. The excavation plans can include, among other things, determining the location, size, and shape of a plurality of cuts into an intended work surface 112 at the worksite 100. In such embodiments, the control system 245 may be used to plan not only the overall excavation, but also to define an implement path of the work surface 122. For a given work surface 112 and pass, for instance, the control system 245 may define a blade path, composed of a loading profile and a carry profile, best suited to guide the machines 102 in an efficient, productive and predictable manner. Although described in connection with planned cut profiles and passes along a work surface 122, the control system 245 may similarly be employed in conjunction with other types of tasks.

Machine 102 may be configured to be operated autonomously, semi-autonomously, or manually. When operating semi-autonomously or manually, the machine 102 may be operated by remote control and/or by an operator physically located within the cab 224.

Machine 102 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 102 and that may cooperate to sense various functions, operations, and operating characteristics of the machine and/or aspects of the environment in which the machine is operating.

A position sensing system 227 may include a position sensor 228, also shown generally by an arrow in FIG. 2 to indicate association with the machine, to sense the position and orientation (i.e., the heading, pitch, roll or tilt, and yaw) of the machine relative to the work site 100. The position sensor 228 may include a plurality of individual sensors that cooperate to generate and provide position signals to controller 246 indicative of the position and orientation of the machine 102. In one example, the position sensor 228 may include one or more sensors that interact with a positioning system such as a global navigation satellite system or a global positioning system to operate as a position sensor. In another example, the position sensor 228 may further include a slope or inclination sensor such as a pitch angle sensor for measuring the slope or inclination of the machine 102 relative to a ground or earth reference. The controller 246 may use position signals from the position sensors 228 to determine the position of the machine 102 within work site 100. In other examples, the position sensor 228 may include a perception based system, or may use other systems such as lasers, sonar, or radar to determine all or some aspects of the position of machine 102.

The position sensing system 227 may also be used to determine a ground speed of machine 102. Other sensors or a dedicated ground speed sensor may alternatively be used to determine the ground speed of the machine 102. In addition, the position sensing system 227 may also be used to determine the position of the work surface upon which the machine 102 is moving. More specifically, based upon known dimensions of the machine 102 and the position of the machine at the work site 100, the position of the work surface may also be determined. As a result, the position sensing system 227 may operate as either or both of a machine position sensing system and a work surface position sensing system. Similarly, the position sensor 228 may operate as either or both of a machine position sensor and a work surface position sensor. Other sensors or a dedicated work surface position sensor may alternatively be used to determine the position of the work surface.

Sensors may be provided to monitor the operating conditions of the engine 213 and drivetrain such as an engine speed sensor 229 and a torque converter speed sensor 230. Other sensors necessary or desirable for operating the machine 102 may be provided.

The control system 245 may include an additional system such as a change in terrain detection system 231. One type of change in terrain detection system 231 that may be used to sense a crest at the work site 100 may be an implement load monitoring system 232. The implement load monitoring system 232 may include any of a variety of different types of implement load sensors 233 to measure the load on the ground engaging work implement or blade 216. For example, as blade 216 of machine 102 moves material over a crest, the load on the blade will be reduced. Accordingly, the implement load sensor system 233 may be utilized to measure or monitor the load on the blade 216 and a decrease in load may be registered by the controller 246 as a change in terrain due to the machine 102 being adjacent the crest. In other instances, an increase in load may indicate an incline or the machine 102 encountering a pile of material. In other words, the controller 246 may determine a change in terrain based at least in part upon a change in the load on blade 216.

In one embodiment, the implement load sensor system 233 may embody one or more pressure sensors for use with one or more hydraulic cylinders, such as second hydraulic cylinders 222, associated with blade 216. Signals from the pressure sensor indicative of the pressure within the second hydraulic cylinders 222 may be monitored by controller 246. Upon receipt of a signal indicating a substantial reduction in pressure within the second hydraulic cylinders 222, the controller 246 may determine that the load on blade 216 has been substantially reduced due to the material having been pushed over a crest. Other manners of determining a reduction in cylinder pressure associated with a reduction in the load on blade 216 are contemplated, including other manners of measuring the pressure within second hydraulic cylinders 222 and measuring the pressure within other cylinders associated with the blade. An increase in pressure indicative of an increase in load may be determined in a similar manner.

In another embodiment, the implement load sensor system 233 may embody sensors for measuring a difference between output from the engine 213 and the output from a torque converter (not shown). More specifically, the engine speed sensor 229 may be utilized to generate a signal indicative of the speed or output of the engine 213 and the torque converter speed sensor 230 may be utilized to monitor the output speed of the torque converter. During an operation such as moving material 130 with blade 216, as shown in FIG. 1, the engine output speed indicated by engine speed sensor 229 and the torque converter output speed indicated by torque converter speed sensor 230 may be relatively constant. Upon moving material over a crest with blade 216, the load on the blade will be substantially reduced and thus cause a change in the relative speeds between the engine 213 and the torque converter. Similarly, an opposite change in relative speeds may also be used to determine an incline. Accordingly, by monitoring the difference between the engine speed and the torque converter speed, changes in incline may be determined.

Other manners of measuring differences between prime mover output and other components within the propulsion and drivetrain mechanisms that are reflective of a change in load on the implement are also contemplated by the present disclosure and understood by those with ordinary skill in the art. Still further, in alternate embodiments in which the machine propulsion and drivetrain mechanisms are hydrostatic or electric, the implement load sensor system may embody other sensors that detect a difference between output from the prime mover and other aspects of the propulsion and drivetrain mechanisms that may be used by the controller 246 to detect a change in load on the blade 216.

In still another embodiment, implement load sensor system 233 may embody an acceleration sensor such as a three-axis accelerometer 235 for providing an acceleration signal indicative of the acceleration of the machine 102. Upon moving a load of material past a crest, the machine 102 may accelerate due to the reduction in load on the blade 216. Similarly, deceleration of the machine 102 may indicate that the machine 102 has encountered an incline. Controller 246 may utilize acceleration of the machine 102 to determine a change in terrain.

In addition to the implement load monitoring systems 232 described above, other change in terrain detection systems may be used either alone or in combination with more than one change in terrain detection system. For example, a change in terrain detection system may use other sensors as a change in terrain sensor for determining a change in terrain. In one example, a pitch angle, as indicated by a pitch angle sensor 236, that exceeds a threshold pitch angle or is outside of an expected range of pitch angles may indicate that the machine 102 is adjacent a crest or an incline. In another example, a change in pitch rate as indicated by a pitch rate sensor 237 that exceeds a threshold rate may indicate that the machine 102 is adjacent a crest or an incline.

Still further, additional systems and sensors may be used to determine a change in terrain or proximity of machine 102 to a crest or an incline. For example, a perception system 238 may also be used to detect the physical location of a crest or an incline. The perception system 238 may be mounted on or associated with the machine. The perception system 238 may include one or more systems such as a radar system, a SONAR system, a LIDAR system, a camera vision system, and/or any other desired system that operate with associated perception sensors 239. Perception sensors 239 may generate data that is received by the controller 246 and used by the controller to determine the position of the work surface upon which the machine 102 is operating including the presence and position of obstacles within the range of the sensors. If desired, the perception system 238 may be used to generate an electronic map and/or images of the environment around machine 102 and the environment analyzed for changes in terrain.

In addition or the alternative, the perception system 238 may include one or more perception sensors 239 movably associated with the machine 102 such as sensors mounted on a mobile machine or device including a drone or unmanned aerial vehicle (not shown).

Figure 3:
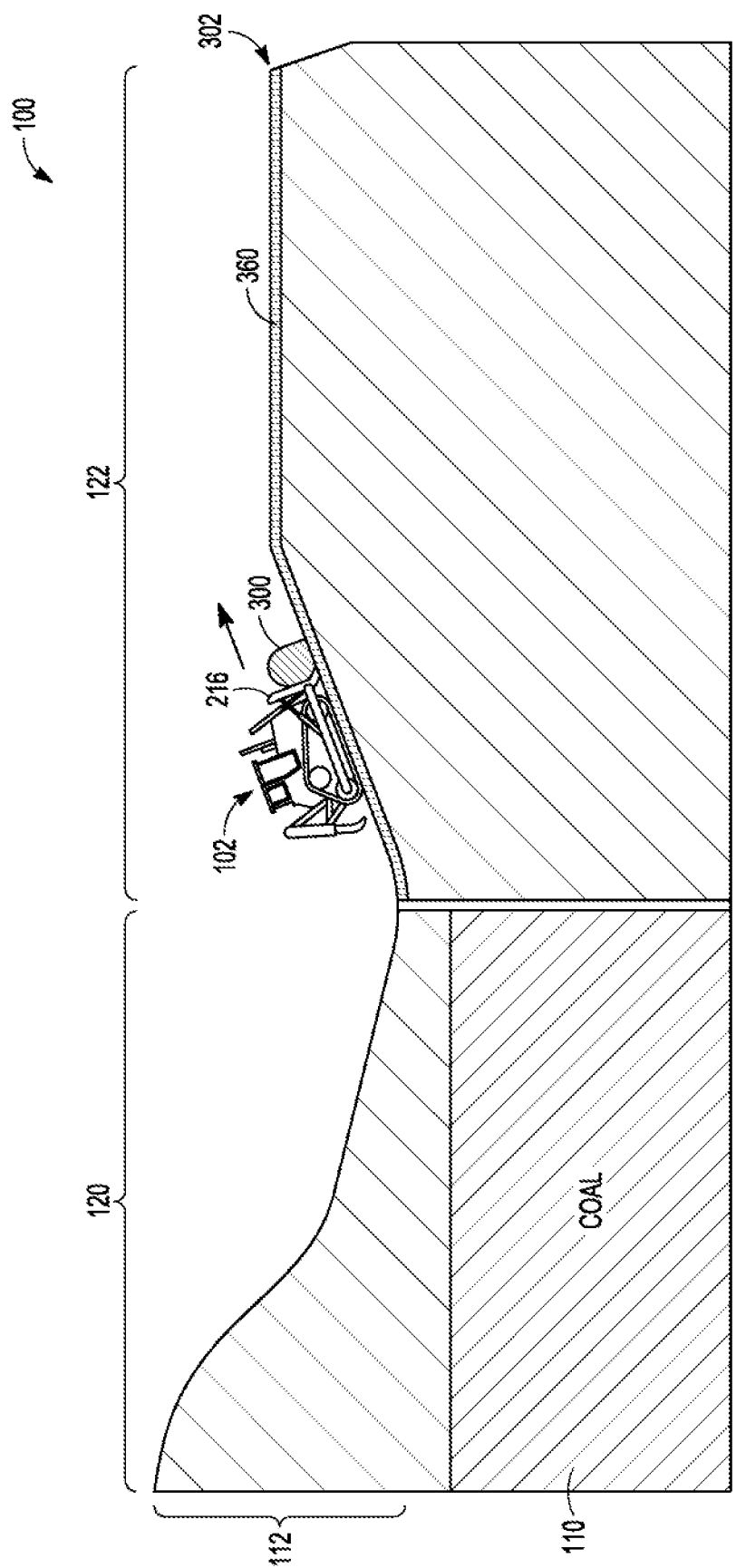
FIGS. 3-6 illustrate a representative back stacking operation in a mining operation.

Referring to FIGS. 3-6, a material back stacking operation is described to form layers of material in a mining operation where upper layer 112 is to be stripped from above a desired lower layer 110, such as coal. During operation, the machine 102, a dozer in one embodiment, makes sequential passes from the first work area 120 toward the second work area 122 to remove material. Each pass removes some volume of material 300 that is pushed to the second work area 122. As shown in FIG. 3, material 300 is pushed by blade 216 of machine 102 toward a predefined target location 302.

It is desired that the removed material 300 is piled relatively uniform in height and spacing to form a fill layer on surface 360. At the start of a new fill layer a first target reverse location 302 for machine 102 is determined based on site criterial such as a crest in the terrain. Alternatively, the initial location can be determined based on preferences in geography, such as an ownership boundary. This first target location 302 is the point where the dozer reverses direction back toward first work area 120 and thus leaves the material 300 that it was pushing in a first pile on surface 360. The location of the machine in one embodiment is the leading-edge of blade 216 such that the machine location and a training edge of material 300 are equal during the fill operation. Other locations of the machine, such as the cab 224, can be used which are a known calibrated distance to the training edge of material 300.

Figure 4:
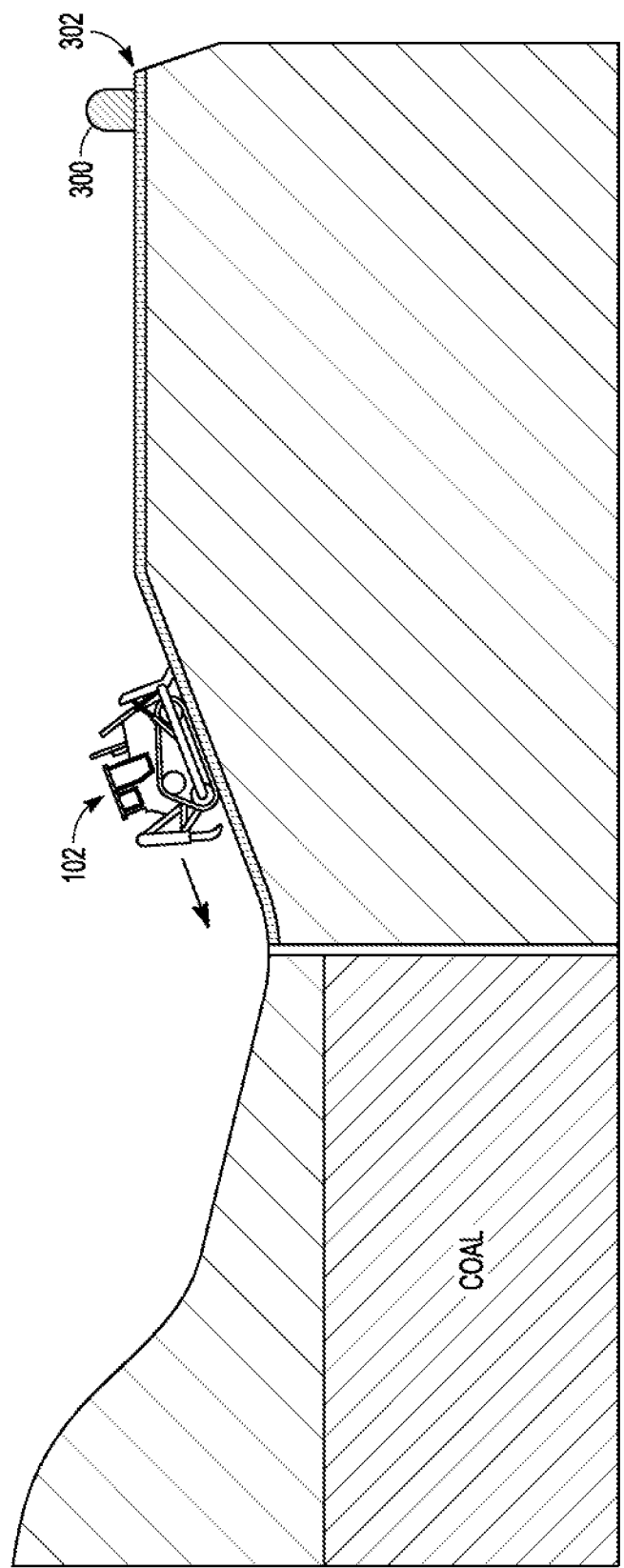
Figure 5:
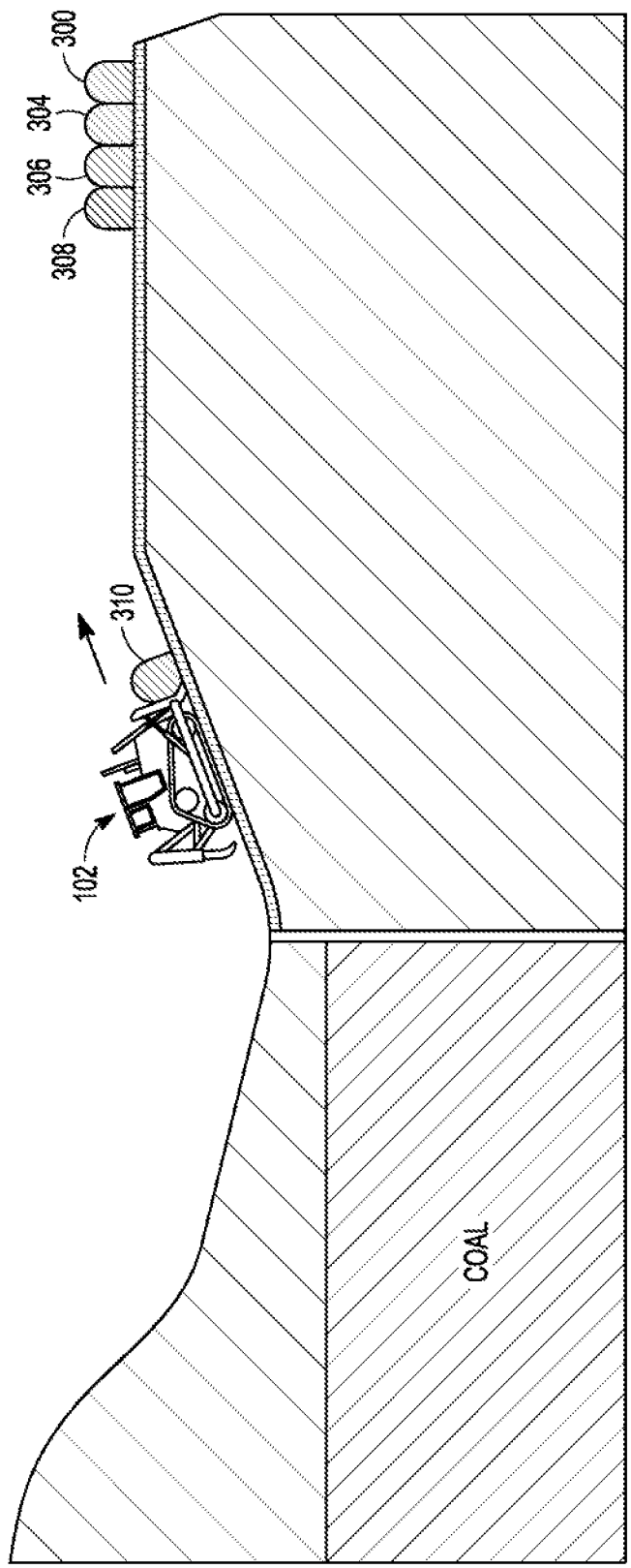

As shown in FIG. 4, after material 300 has been left at location 302, machine 102 reverses direction to return to first work area 120 to make another material movement operation. It is desired on subsequent passes that each material pile is located adjacent to the previous material pile without leaving gaps or crushing the previous pile. As shown in FIG. 5, material piles 304, 306 and 308 have been pushed to adjacent locations to material pile 300.

A target reverse point for a current material pass is calculated by the control system 245 based on the last reverse point of the machine 102. That is, the last reverse point is generally equal to the location of the trailing edge of the last material pile added to the fill layer. In one embodiment, referring to FIG. 6, the new target reverse point 320 for material pile 310 is calculated based on an average width of a material pile, such as a pre-determined spacing width of 2.5 to 3.0 meters. It may be desired to select the spacing as smaller than an average pile width determined by characteristics such as the type of dozer and the material being removed. For example, a spacing of 2.5 meters may be used where an average pile width of 3.0 meters.

To allow for real-world variables, the control system 245 calculates a range 324, or window, in which the machine can reverse directions based on the target reverse point 320. In one embodiment, the target reverse point 320 is considered a farthest most reverse point. That is, the farthest most reverse point is a location that the machine will not be allowed to travel past during the material movement operation. The window 324, also referred to as a pile detection zone, can have a preset width, such as 5 meters between reverse point 320 and a leading-edge 322 of the window. During operation, the machine 102 pushes material toward the target reverse point 320 until the control system 245 determines the machine has reached the leading-edge 322 of the pile detection zone 324. Once inside the pile detection zone, the control system 245 calculates an actual machine reverse location based on output from the sensors of the machine and a calculated load on the machine, as described above.

If a new material pile is placed based solely on farthest most reverse point 320, which is based on average pile width, there might be some gaps or overlaps between piles, causing inconsistent pile height for this layer. Instead, when a new material pile is located based on the output of sensors, it indicates that the dozer "feels" resistance, or load, from the last material pile. As such, the new material pile has reached the actual trailing edge of the last material pile. The new reverse point of machine 102, therefore, in one embodiment, is determined based on the detected machine load within the pile detection zone 324. If sufficient resistance is not detected in the pile detection zone 324, the control system 245 will reverse the machine 102 when it reaches the farthest most reverse point 320.

In another embodiment, the farthest most reverse point 320 can be set to be past the target reverse point. For example, if the target reverse point was set at 2.5 meters from the last reverse point, the farthest most reverse point can be set to 2.0 meters. In this embodiment, the farthest most reverse point 320 is set to be slightly beyond the target reverse point to increase the opportunity to detect the previous material pile while avoiding a sensor malfunction causing the machine 102 to try to crush the previous material pile or even get stuck.

In an illustrative example, if the last reverse point is at 100 meters (relative to a reference point along the cut path), the current farthest most reverse point is calculated by the control system 245 to be 97.5 meters. Based on a pile detection zone 324 width of 5 meters, the control system 245 calculates that the pile detection zone begins at 92.5 meters and ends at 97.5 meters. The control system implements a pile detection algorithm and monitors machine 102 sensor outputs within this area to determine when to reverse the machine. If the control system 245 determines that the machine has reached a predetermined load threshold from the last pile at 0.5 meters ahead of the farthest most reverse point (97 meters), the control system 245 uses the minimum value of 97.5 or 97 meters, and thus instructs the machine 102 to reverse direction at 97 meters. It will be appreciated by those skilled in the art that the terms instruct an instructing, as used in the present disclosure, encompasses providing machine readable instructions, control signals or data that is used by the machine 102 to perform operations or tasks.

Use of the detection window 324 and actual sensed machine load is to account for real world applications where it cannot be ensured that the machine is moving exactly the same amount of materials each time. Thus, the width of actual material piles will not always be exactly the same as the average width. If the control system 245 instructs the machine 102 to leave a new material pile at a farthest most reverse point, there might be some gaps or overlaps between successive material piles, causing inconsistent material pile height for this fill layer. Instead, when a material pile location is determined from sensors outputs and a control system algorithm, the new material pile can be more accurately located for uniform layering.

Figure 6:
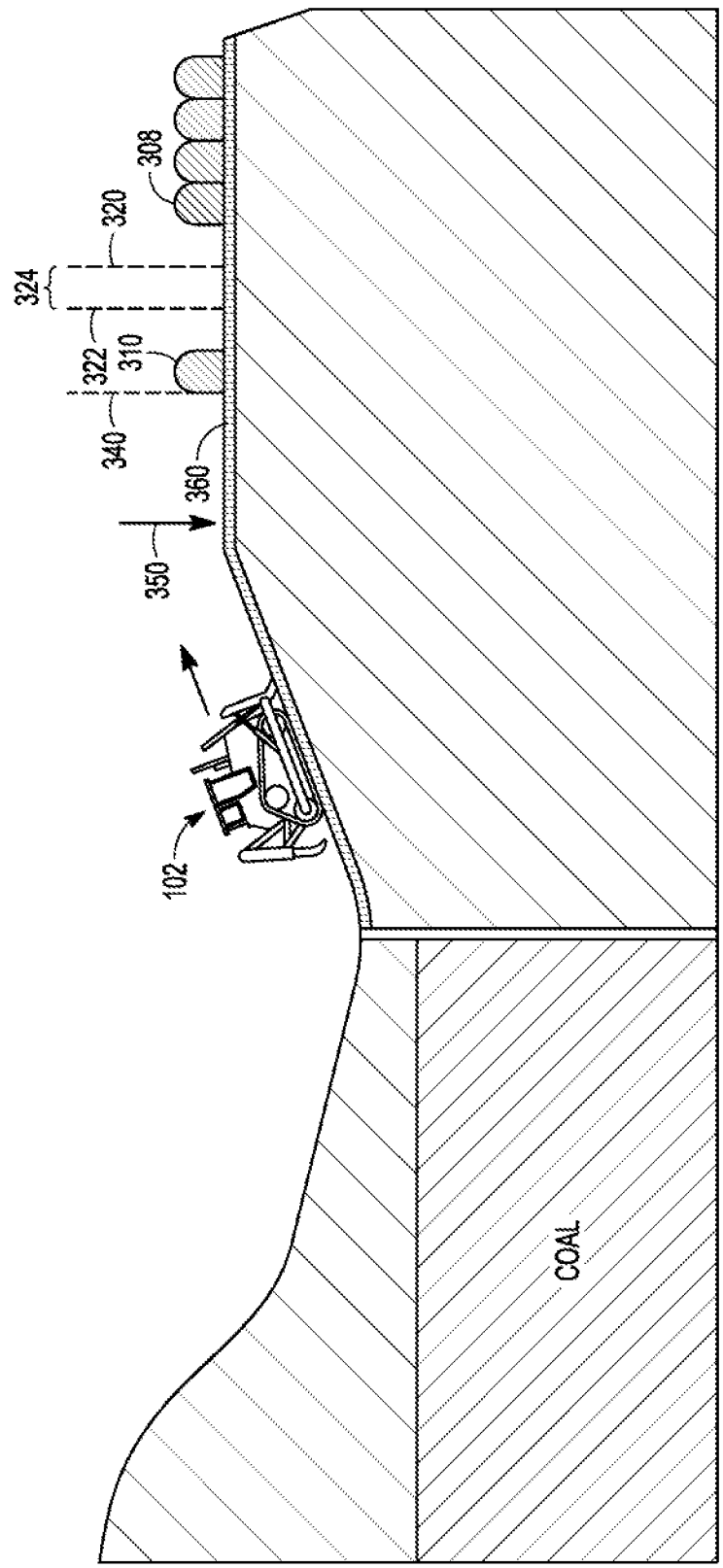

In operation, referring to FIG. 6, the control system 245 instructs the machine 102 to move forward to push material 310 toward the last previously stacked material pile 308 until it is determined that the machine has reached the leading-edge 322 of detection zone 324 and then the control system 245 would control the machine to reverse when the proper location of the material pile is determined from the machine sensors, or a farthest most location 320 is reached. In the illustrated example, however, machine 102 reversed direction too early, for example due to a detection fault, the machine 102 therefore leaves material pile 310 at an unwanted location 340 outside of the pile detection zone 324. In this condition, the control system 245 stores a reverse location 340 of the machine that represents a location of the premature material pile 310. Prior to calculating a new material movement sequence, the control system 245 first determines if there is an existing premature pile 310, for example by checking a status of a data flag that representing a premature pile location 340. If there is a stored premature pile location, the control system 245 issues instruction to machine 102 intended to correct the premature pile condition.

In one embodiment, the control system 245 issues instructions to machine 102 to move to an alignment location 350 in front of the premature pile 310 without cutting or removing additional material (empty blade). The alignment location 350, in one embodiment, can be a predefined distance from the premature pile location 340 to provide for adequate machine alignment and operation, for example 15 meters. The control system 245 then instructs machine 102 to start a material movement operation at a start location at, adjacent to, or near, the trailing edge 340 of the premature pile 310. The start location can be equal to the trailing edge 340 of the premature pile 310 or before the trailing edge 340 of the premature pile 310. It will be understood that any acceptable distance can be selected such that the volume of material pile 310 is not substantially increased.

The control system 245 instructs machine to lower its blade 216 to engage fill surface 360 just before (some predetermined distance) the premature pile location 340 and to push the immature pile 310 toward the existing stacked pile 308. When material pile 310 has been properly positioned within the zone 324 (as described above), the control system 245 clears the immature pile location data flag from memory and then the machine continues to its next normal material movement operations.

INDUSTRIAL APPLICABILITY

In general, the present disclosure sets forth methods, devices and systems for controlling machines 102, where there are motivations to promote predictability and improve overall efficiency and productivity. Although applicable to any type of machine, the present disclosure may be particularly applicable to autonomously or semi-autonomously controlled dozing machines where the dozing machines are controlled along particular travel routes within a worksite to excavate materials. Moreover, the present disclosure promotes predictability by recognizing different possible scenarios, and providing automated responses for each scenario designed to maximize productivity.

Figure 7:
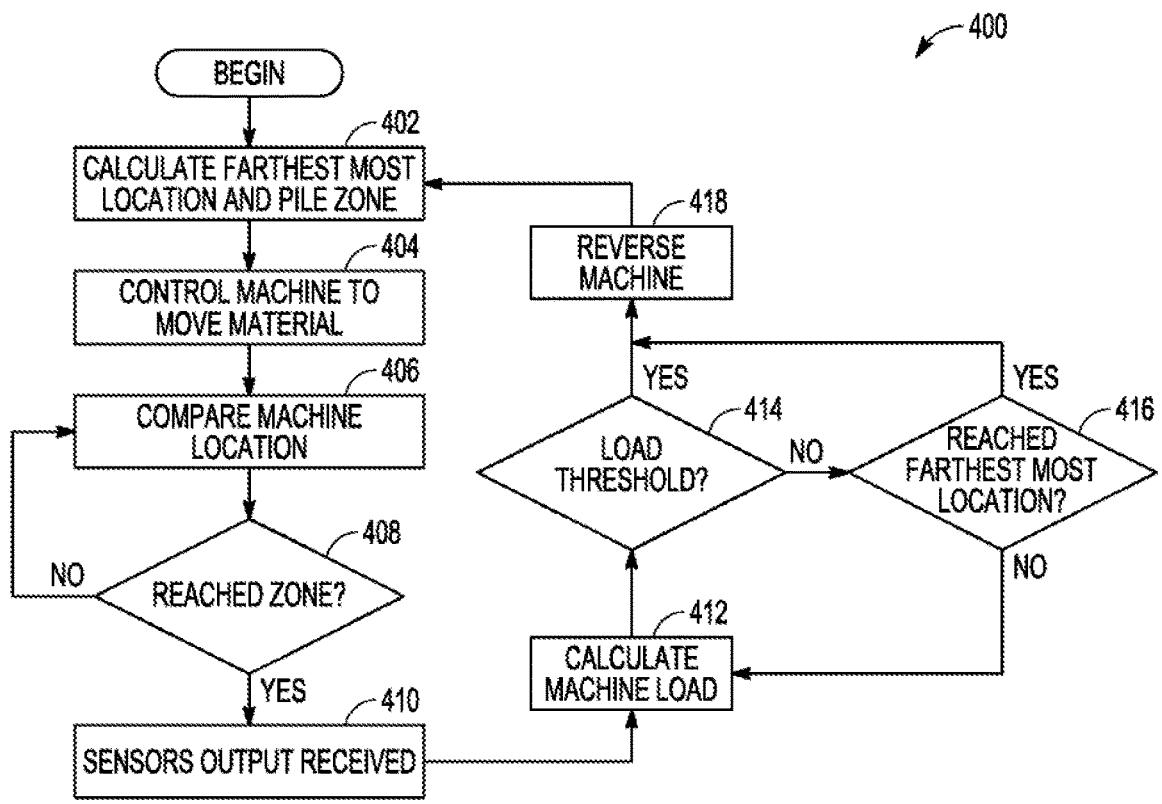
FIG. 7 illustrates one exemplary algorithm or computer-implemented method for back stacking material in accordance with this disclosure.

Turning to FIG. 7, one exemplary algorithm 400 or computer-implemented method for back stacking material is diagrammatically provided, according to which the control system 245 may be configured to operate. As shown in step 402 of FIG. 7, the control system calculates material pile parameters including the farthest most reverse location 320 and the leading-edge 322 of the pile detection zone 324. The control system controls, at step 404, machine 102 to move material from first work area 120 to second work area 122. The control system monitors the machine location and compares, at step 406, the location of the machine to leading-edge location 322 to calculate, at step 408, if the machine has reached the leading-edge 322 of the pile detection zone 324. When the machine has reached the leading-edge 322, the machine sensor outputs, at step 410, are used by the control system to calculate a machine load at step 412. If the calculated machine load has not reached a predetermined threshold limit, at step 414, the control system compares, at step 416, the machine location to the farthest most reverse location 320. If the machine reaches the farthest most reverse location 320, the machine is controlled at block 418 to reverse direction. Similarly, if the machine load has reached a predetermined threshold limit at 414, the machine is controlled, at step 418, to reverse direction. The control system then calculates at block 402 new material pile parameters including the farthest most reverse location 320 and the leading-edge 322 of the pile detection zone 324 based on the reverse location from step 418.

Figure 8:
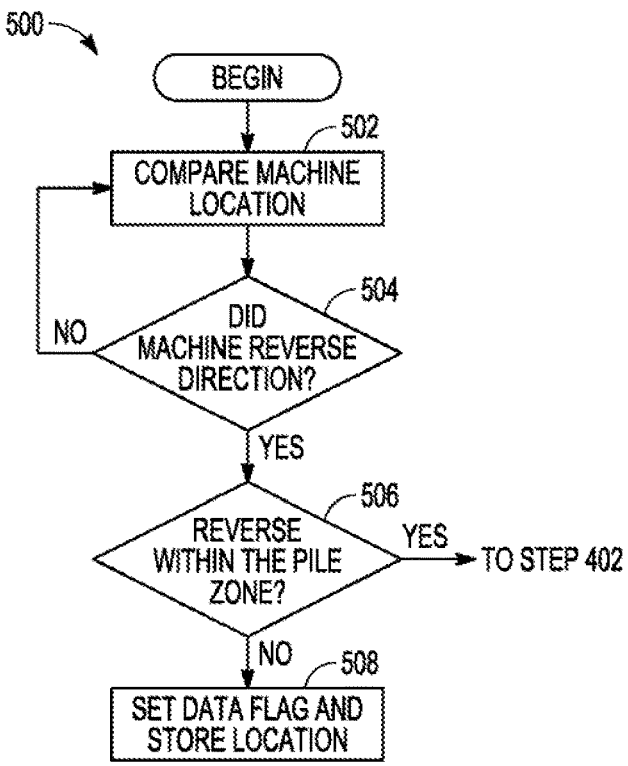
FIG. 8 illustrates one exemplary sub-algorithm, algorithm or computer-implemented method for detecting an immature pile in accordance with this disclosure.

Referring now to FIG. 8, one exemplary sub-algorithm 500, algorithm or computer-implemented method is illustrated for detecting an immature, or improperly placed, material pile 310, according to which the control system 245 may be configured to operate. The control system 245 compares, at step 502, the machine 102 location to the work area to calculate 504 when the machine reverses direction. This reverse location is compared, at step 506, by control system 245 to the leading-edge 322 location of pile detection zone 324 to determine a premature direction reversal location 340 (FIG. 6). If the machine reversed direction prior to reaching the pile detection zone, the control system sets, at step 508, a data flag that a premature material pile was created. That is, in one embodiment, control system 245 calculates a deviation distance between the reverse location 340 and the leading-edge 322 of the pile detection zone 324. If the deviation distance exceeds a threshold value, a premature pile is detected and a premature pile data flag is set. The premature pile data flag can be a machine-readable data flag, the location 340 of the material pile, a combination of both, or any other suitable machine-readable indication.

In one embodiment, the deviation distance threshold between the reverse location 340 and the beginning of the pile detection zone 324 can be zero distance or some other positive distance, such as 1 meter. If a premature material pile is detected, the control system also stores the machine reverse location 340 in memory.

Figure 9:
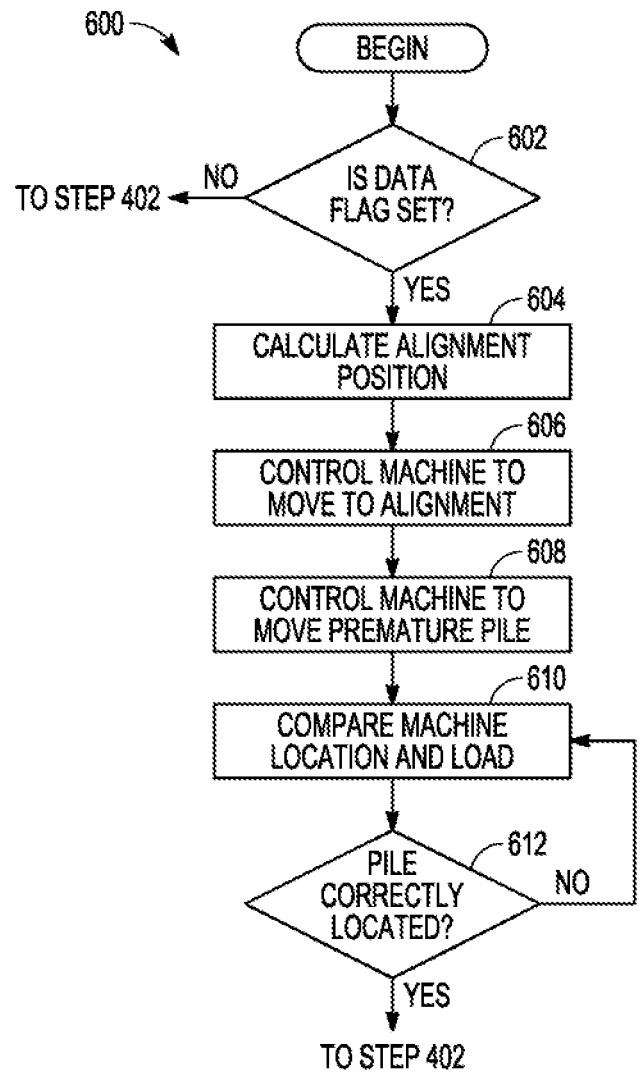
FIG. 9 illustrates one exemplary sub-algorithm, algorithm or computer-implemented method, in accordance with this disclosure, for setting new pile parameters and responding to an immature pile detection.

Referring now to FIG. 9, one exemplary sub-algorithm 600, algorithm or computer-implemented method for setting new pile parameters and responding to an immature pile detection, according to which the control system 245 may be configured to operate. Upon successful completion of a material movement operation, or direction reversal of the machine, the control system 245 checks the status, at step 602, of the premature pile flag. If the premature pile flag is not set to indicate a premature machine reversal, the control system calculates 402 the new pile parameters, as explained above. If the premature pile flag is set, however, the control system 245 uses the stored machine reverse location 340 to calculate, at step 604, the alignment location 350 in front of location 340 of premature pile 310. The distance between the alignment location and the premature pile can be any distance based on the machine and operation environment, for example in one embodiment the distance is 15 meters. The control system 245 first controls, at step 606, machine 102 to first move to the alignment location 350 and then controls, at step 608, the machine to engage the premature pile 310 and move it to the pile detection zone 324, as described above. In one embodiment with a dozer, the control system 245 instructs the dozer to move toward the premature pile with its blade 216 elevated above surface 360. When the dozer is near the premature pile location 340, the dozer is controlled to lower the blade 216 to fill surface 360 such that it engages the premature material pile 310 and pushes it into the pile detection zone 324. The controller compares the machine location to the pile detection zone 324 and calculates the machine load, at step 610, as explained above. Once the pile is determined to be properly placed, at step 612, using the calculated machine load or farthest most reverse location, as described above, the control system 245 clears the premature pile data flag, at step 612.

From the foregoing, it will be appreciated that while only certain embodiments have been set forth for the purposes of illustration, alternatives and modifications will be apparent from the above description to those skilled in the art.

The claimed invention is:

1. A computer-implemented method of responding to a premature direction reversal of a material moving machine, the computer-implemented method comprising:
   monitoring, by a control system, a location of the material moving machine while the material moving machine is moving a material to form a fill layer of the material within a fill layer zone;
   calculating a target reverse point indicative of a target material pile location as adjacent to a location of a previously placed material pile within the fill layer zone using a previous reverse point of the material moving machine for the previously placed material pile within the fill layer zone and a size of an average material pile;
   determining, by the control system, a premature direction reversal of the material moving machine at a premature direction reversal location based at least partially on a deviation distance between the location of the material moving machine and the target material pile location, wherein the premature direction reversal is indicative of leaving a pile of material as an improperly placed material pile;
   identifying a position of the improperly placed material pile based on the premature direction reversal location;
   storing, by the control system, the position of the improperly placed material pile;
   controlling, by the control system, the material moving machine to align the material moving machine with the improperly placed material pile; and
   controlling, by the control system, the material moving machine to re-engage and move, using an implement of the material moving machine, the improperly placed material pile to the target material pile location within the fill layer zone.

2. The computer-implemented method of claim 1, wherein the deviation distance between the location of the material moving machine and the target material pile location is compared by the control system to a predefined distance threshold to determine the premature direction reversal location of the material moving machine.

3. The computer-implemented method of claim 1, wherein the material moving machine is a dozer and the control system provides instructions to the dozer to lower a blade at the position of the improperly placed material pile to re-engage the improperly placed material pile.

4. The computer-implemented method of claim 1, further comprising:
calculating, by the control system, a pile detection zone within the fill layer zone having a leading-edge location and a farthest most reverse location;
monitoring outputs of material moving machine sensors with the control system when the material moving machine is located within the pile detection zone; and
controlling, by the control system, the material moving machine to reverse its direction when the control system calculates that a predetermined threshold load level on the implement of the material moving machine has been exceeded based on the outputs of the material moving machine sensors.

5. The computer-implemented method of claim 4, wherein determining the premature direction reversal location of the material moving machine is based at least partially on the deviation distance being greater than zero between the location of the material moving machine and the leading-edge location of the pile detection zone.

6. The computer-implemented method of claim 1, further comprising setting, by the control system, an immature pile location data flag indicating that the premature direction reversal location of the material moving machine was determined by the control system.

7. The computer-implemented method of claim 1, wherein controlling the material moving machine, by the control system, to align the material moving machine with the improperly placed material pile comprises:
instructing the material moving machine to move to a first location apart from the position of the improperly placed material pile; and
instructing the material moving machine to move from the first location to the position of the improperly placed material pile
instructing the material moving machine to activate the implement of the material moving machine to re-engage the improperly placed material pile.

8. The computer-implemented method of claim 1, wherein the control system comprises a first controller located with the material moving machine and a second controller located remote from the material moving machine.

9. A control system for responding to an incomplete material pile during a material layering operation by a material moving machine, the control system comprising:
a memory configured to retrievably store one or more algorithms; and
a controller in communication with the memory, the controller, based on the one or more algorithms, configured to:
calculate a target reverse point indicative of a target material pile location as adjacent to a location of a previously placed material pile within a fill layer zone using a previous reverse point of the material moving machine for the previously placed material pile within the fill layer zone and a size of an average material pile, the material moving machine moving material to form a fill layer within the fill layer zone;
identify a premature direction reversal of the material moving machine at a premature direction reversal location leaving a pile of the material as the incomplete material pile, the premature direction reversal identified based at least partially on a material moving machine position and the target material pile location;
instruct the material moving machine to align with the premature direction reversal location, and
instruct the material moving machine to engage an implement to restart a material movement procedure at the premature direction reversal location to move material of the incomplete material pile to the target material pile location within the fill layer zone.

10. The control system of claim 9, wherein the controller is configured to calculate a deviation distance between the material moving machine position and the target material pile location relative to a predefined distance threshold stored in the memory in identifying the premature direction reversal.

11. The control system of claim 9, wherein the controller is configured to set a data flag in response to detecting the premature direction reversal and to store the premature direction reversal location.

12. The control system of claim 9, wherein the controller is configured to define a farthest location and a nearest location with respect to the target reverse point for the target material pile location based at least partially on the location of the previously placed material pile.

13. The control system of claim 9, wherein the controller comprises a first controller located with the material moving machine and a second controller located remote from the material moving machine.

14. An autonomous method of mining using a dozer comprising a drive mechanism to move the dozer in forward and reverse directions, an adjustable blade for pushing material when the dozer moves in the forward direction, and a location position sensor to determine a position of the dozer, the method comprising:
monitoring the location of the dozer while the dozer is moving material using the adjustable blade to form a fill layer within a fill layer zone;
calculating a target reverse point for the dozer using a previous reverse point of the dozer for a previously placed material pile within the fill layer zone and a size of an average material pile;
calculating a target material pile location zone that includes the target reverse point within the fill layer zone for the dozer to push the material, the target material pile location zone adjacent a location of the previously placed material pile within the fill layer zone and the target material pile location zone including a beginning location and farthest location with respect to the target reverse point for the dozer;
providing instructions to the drive mechanism and the adjustable blade of the dozer to move the dozer toward the target material pile location zone while pushing the material;
comparing the location of the dozer to the target material pile location zone;
storing the location of the dozer when it reverses direction from the forward direction to the reverse direction when the dozer reverses direction before the dozer entered the target material pile location zone while pushing the material, thereby forming an improperly placed material pile; and
providing instructions to the drive mechanism and the adjustable blade of the dozer to move the dozer to the improperly placed material pile and adjust the blade to push the improperly placed material pile into the target material pile location zone within the fill layer zone.

15. The method of claim 14, wherein calculating the target material pile location zone comprises:
retrieving from a memory the location of the previously placed material pile in the fill layer zone;
calculating the farthest location based upon the retrieved location; and
calculating the beginning location based upon a predetermined distance from the farthest location.

16. The method of claim 14, further comprising:
monitoring outputs of sensors of the dozer while the dozer is located within the target material pile location zone;
calculating a load on the dozer based upon the sensor outputs; and
providing instructions to the dozer to reverse direction from the forward direction to the reverse direction when the calculated load exceeds a predetermined threshold level.

17. The method of claim 16, further comprising providing instructions to the dozer to reverse direction from the forward direction to the reverse direction when the dozer reaches the farthest location before the calculated load exceeds the predetermined threshold level.

18. The method of claim 14, further comprising setting a machine-readable data flag when the dozer forms the improperly placed material pile.

19. The method of claim 14, wherein providing the instructions to the drive mechanism and the adjustable blade of the dozer to move the dozer to the improperly placed material pile comprises:
providing first instructions to the dozer to move the dozer to a first location a predetermined distance from the location of the improperly placed material pile;
providing second instructions to the dozer to move the dozer from the first location to the location of the improperly placed material pile; and
providing third instructions to the dozer to lower the adjustable blade prior to the dozer reaching the location of the improperly placed material pile.

20. The method of claim 14, wherein the dozer further comprises a first dozer controller located with the dozer and in communication with the drive mechanism and the adjustable blade.

* * * * *